3,377,340
PROCESS FOR PREPARING N-VINYL AMIDES AND N-VINYL LACTAMS
Robert Hartwimmer, Hofheim, Taunus, and Wolfram Schwiersch, Frankfurt am Main, Germany, assignors to Farbwerke Hoechst Aktiengesellschaft vormals Meister Lucius & Bruning, Frankfurt am Main, Germany, a corporation of Germany
No Drawing. Filed July 14, 1964, Ser. No. 382,640
Claims priority, application Germany, July 20, 1963, F 40,290
5 Claims. (Cl. 260—239.3)

ABSTRACT OF THE DISCLOSURE

The use of a surface-active, insoluble compound having a weakly acid reaction, such as acid aluminum oxide, aluminum phosphate and zirconium dioxide, to facilitate preparation of an N-vinyl lactam or N-vinyl amide from a corresponding N-($\alpha$-alkoxyalkyl) lactam or amide, respectively.

---

It is known that N-($\alpha$-alkoxyethyl)-lactams can be split into alcohols and N-vinyllactams by heating them to high temperatures (Isvestija Akademii Nauk SSR Chimija, 1959, 892–895). In view of the very high splitting temperatures of 200–300° C. to be applied and the relatively low splitting speed the known process leads to considerable losses of monomeric N-vinyllactam, particularly when larger quantities of substance are used, since a considerable part of it polymerizes and becomes resinous during the continuous thermal treatment, in spite of the presence of stabilizers.

The present invention is based on the observation that N-vinyl compounds of the general formula

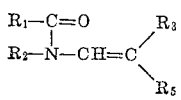

in which $R_1$ and $R_2$ each represents an alkyl group or $R_1$ and $R_2$ can be linked with each other as a ring while forming an alkylene group which may be substituted by alkyl groups, and $R_3$ and $R_4$ represent hydrogen atoms or alkyl groups, can be prepared by catalytic splitting of N-($\alpha$-alkoxyalkyl)-compouds of the general formula

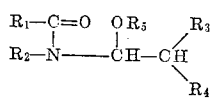

in which $R_1$, $R_2$, $R_3$ and $R_4$ have the meanings given above and $R_5$ represents an alkyl group, by heating them in liquid phase in the presence of surface-active, insoluble substances having a weakly acid reaction.

The reaction according to the process of the present invention takes place according to the following reaction equations:

(1)
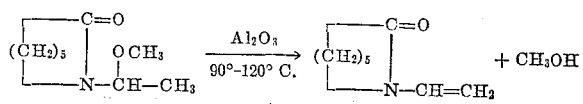

(2)
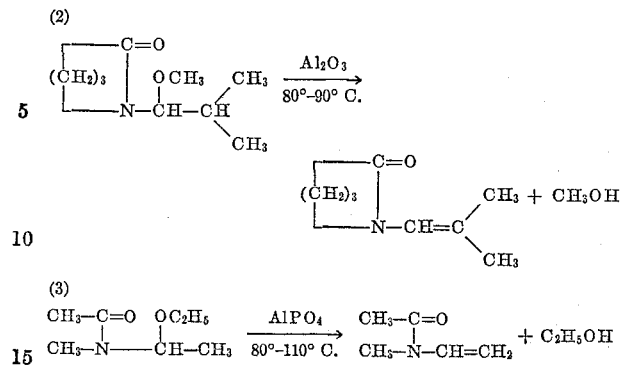

(3)
$$CH_3-\underset{\underset{CH_3-N}{|}}{C}=O \quad O C_2H_5 \atop \underset{|}{CH}-CH_3 \xrightarrow[80°-110°\ C.]{AlPO_4} CH_3-\underset{\underset{CH_3-N}{|}}{C}=O \atop \underset{|}{CH}=CH_2 + C_2H_5OH$$

The following compounds may be used according to the process of the present invention as starting compounds capable of being split: N-($\alpha$-alkoxyalkyl)-lactams such as N-($\alpha$-methoxyethyl)-pyrrolidone-(2),
N-($\alpha$-ethoxyethyl)-pyrrolidone-(2),
N-($\alpha$-i-propoxyethyl)-pyrrolidone-(2),
N-($\alpha$-tert. butoxyethyl)-pyrrolidone-(2),
N-($\alpha$-ethoxyethyl)-piperidone-(2),
N-($\alpha$-n-butoxyethyl)-piperidone-(2),
N-($\alpha$-methoxyethyl)-caprolactam,
N-($\alpha$-isobutoxyethyl)-caprolactam,
N-($\alpha$-amyloxyethyl)-caprolatam,
N-($\alpha$-ethoxyethyl)-capryllactam,
N-($\alpha$-methoxyethyl)-lauryllactam,
N-($\alpha$-meththoxypropyl)-caprolactam,
N-($\alpha$-methoxy-$\beta$-methyl-n-propyl)-pyrrolidone-(2) or
N-($\alpha$-methoxy-$\beta$-methyl-n-propyl)caprolactam;

compounds substituted in the lactam ring, such for example as

N-($\alpha$-methoxyethyl)-5,5-dimethyl-piperidone-(2),
N-($\alpha$-ethoxyethyl)-4-ethylpyrrolidone-(2) or
N-($\alpha$-methoxyethyl)-3,5-dimethylcaprolactam; and
N-($\alpha$-alkoxyalkyl)-N-alkyl carboxylic acid amides, such for example as N-($\alpha$-methoxyethyl)-N-methyl-acetamide,
N-($\alpha$-ethoxyethyl)-N-methylacetamide,
N-($\alpha$-i-propoxyethyl)-N-ethyl-acetamide,
N-($\alpha$-methoxyethyl)-N-propyl-acetamide,
N-($\alpha$-methoxyethyl)-N-methyl-propionamide,
N-($\alpha$-ethoxyethyl)-N-ethyl-propionamide,
N-($\alpha$-methoxypropyl)-N-methyl-acetamide or
N-($\alpha$-ethoxy-$\beta$-methyl-n-propyl)-N-methyl-acetamide.

The N-($\alpha$-alkoxyalkyl)-compounds used as starting compounds can be easily prepared in very good yields by reacting open chain or cyclic carboxylic acid amides which carry at least 1 hydrogen atom capable of being substituted on the nitrogen atom, with acetals or hemiacetals the aldehyde component of which contains more than 1 carbon atom; or with acetal or hemicacetal-forming components in the presence of acid catalysts.

As weakly acid, surface-active, insoluble catalysts there can be used, for example acid aluminum oxides, such as acid aluminum oxide according to Woelm (anionotropic), and/or acid aluminum phosphates. Weakly acid compounds of zirconium, advantageously zirconium dioxide can also be used as catalysts. Even minor quantities, for example 0.5 mol percent of those catalysts produce an increase in the reaction speed of 50–100%, at the same time reducing the splitting temperature by an average of 100–200° C. This extraordinary activity of the catalysts to be used according to the process of the present invention and their indifference towards the N-vinyl compounds formed, permit carrying out the splitting in an elegant and economical way, thereby, the products of the invention are in many cases obtained with nearly quantitative reaction rates in practically theoretical yields.

The average catalyst quantity required for the splitting is about 0.5 to 15 mols percent. After the reaction has taken place, the catalysts used can be recovered in unchanged condition and can, therefore, be used again. The temperature with which the splitting starts and proceeds with a satisfactory speed is in general between about 50 and 180° C. The optimum reaction temperatures depend mainly on the type of the catalyst and the character of the starting compound to be split.

The splitting can be carried through under slight excess pressure or under normal pressure; it is, however, advantageous to operate under reduced pressure.

The splitting reaction is advantageously carried out by heating the N-($\alpha$-alkoxyalkyl)-compounds together with the catalyst and preferably in the presence of small quantities of a stabilizer for the vinyl compound obtained, for example hydroquinone, in a reaction vessel while stirring simultaneously and passing through a stream of nitrogen. The pressure is chosen in such a way that when the optimum splitting temperature is attained in the reaction vessel, the vinyl compound formed passes over via a separating column, and the separated readily volatile alcohol is condensed in a cooling trap while the compound to be split is not yet boiling. If the boiling points of the vinyl compound and of the starting material are close together, the pressure is chosen in such a way that at the optimum splitting temperature in the sump, first only the alcohol distils over at the head of the column. As soon as the quantity to be expected stoichiometrically has passed over, the pressure is reduced until the vinyl compound boils and passes over the column. It is preferable to rectify the crude product once again.

It was surprising that N-($\alpha$-alkoxyalkyl)-compounds used as starting compounds according to the process of the present invention could be converted in a smooth reaction in the presence of surface-active, insoluble substances having a weakly acid reaction, into the corresponding N-vinyl compounds. Alkaline or neutral catalysts either produce no effect at all on the material to be split, or they provoke reactions with different results. On the other hand acid substances having an acidity which exceeds that of the substances used in the process of this invention, for example acids, Lewis acids, sulfonic acids, acid chlorides, bisulfates, alums, beryllium oxide, aluminum fluoride, ammonium chloride or bleaching earths, permit separating the alcohol completely and rapidly from the starting compounds, but they cause, furthermore, an instantaneous dimerization or polymerization or a complete resinification of the monomeric N-vinyl compounds formed first. In the latter case, there is obtained instead of the monomeric compound, for example the dimerization product of vinylcaprolactam, i.e. 1,3-bis-caprolactamyl-butene-(1) or 1,3-bis-pyrrolidonyl-butene-(1) as dimerization product of vinylpyrrolidone.

In comparison with the known processes, the new process is advantageous in that the starting compounds, which are easily accessible by a single stage process, can be converted through the splitting reaction which has a selective effect and takes a rapid course already with a slight increase in temperature, into N-vinyl compounds. The reaction is smooth and good yields are obtained. Another advantage consists in the fact that the separated alcohol can be used again for the preparation of the starting ess of the present invention are valuable intermediate compound.

The N-vinyl compounds obtained according to the process products and are particularly suitable for homopolymerization and copolymerization.

The following examples serve to illustrate the invention, but they are not intended to limit it thereto:

Example 1

1540 grams (9 mols) of N-($\alpha$-methoxyethyl)-caprolactam are introduced into a four-necked flask of 2 liters capacity, equipped with a stirrer, a sump thermometer, a nitrogen inlet tube and a fractionating column consisting of a 70-cm. column with silver lining and coil packing and column head, and 18.4 grams (180 millimols=2 mol percent) of finely pulverized acid (anionotropic) aluminum oxide according to Woelm and 1 gram of hydroquinone are added as stabilizers. The contents of the flask are heated while stirring vigorously and passing through a stream of nitrogen, the pressure being maintained simultaneously at 30 mm. of mercury. Already at 90° C. a vivid separation of methanol sets in. After a splitting period of 5 hours the temperature is elevated for a further hour to 120–140° C. and the pressure is increased to 50–80 mm. of mercury. By reducing the pressure to 20 mm. of mercury the N-vinylcaprolactam is subsequently caused to distil over, and the fraction passing over at 129–130° C., which already in the receiver solidifies to form colorless crystals melting at 34–35° C., is collected.

1127 grams (8.1 mols) of pure N-vinyl-caprolactam are obtained, which corresponds to a yield of 90% of theory. 290 grams (9.06 mols) of methanol were collected in the cooling traps.

Example 2

428 grams (2.5 mols) of pure N-($\alpha$-methoxyethyl)-caprolactam having a refractive index of $n_D^{20}=1.4702$ are split within two and a half hours at a temperature of 110–145° C. and under a pressure of 40–50 mm. of mercury in the apparatus described in Example 1 in the presence of 2.55 grams (25 millimols=1 mol percent) of acid aluminum oxide according to Woelm and 0.5 gram of hydroquinone, and subsequently worked up by distillation. There are obtained 292 grams (2.1 mols) of N-vinyl-caprolactam, boiling at 129–130° C. under a pressure of 20 mm. of mercury and 74.8 grams (2.34 mols) of methanol. The losses of product, caused mainly by polymerization, amount to 35 grams (0.26 mol). From these results a splitting of 93.6% and a yield of N-vinyl-caprolactam of 89.7% of theory and a recovery of 27.4 grams (0.16 mol) of the starting compound can be calculated.

Example 3

342 grams (2 mols) of pure N-($\alpha$-methoxyethyl)-caprolactam are heated in the apparatus described in Example 1 in the presence of 12.1 grams (100 millimols= 5 mol percent) of aluminum phosphate and 0.5 gram of hydroquinone while stirring thoroughly and under reduced pressure. Splitting starts at 80° C. During the following 3 hours the temperature is increased gradually to 140° C., the N-vinyl-caprolactam formed and the non-split starting material is then distilled off under reduced pressure from the reaction flask and then rectified once again. 44 grams (1.375 mol) of methanol are isolated in the cooling traps, 97.5 grams (0.57 mol) of N-($\alpha$-methoxy-ethyl)-caprolactam are recovered and 171.5 grams (1.23 mol) of N-vinylcaprolactam having a refractive index of $n_D^{20}=1.5135$ are obtained, which corresponds to a yield of 86.7% of theory.

Example 4

342 grams (2 mols) of N-($\alpha$-methoxyethyl)-caprolactam are split and worked up as described in Example 3 in the presence of 12.3 grams (5 mols percent) of zirconium dioxide. The following compounds are obtained:

Separated methanol: 57.9 grams (1.81 mols) $n_D^{20}=$ 1.3308.

N-vinylcaprolactam: 126 grams (0.91 mol=50.3% of theory).

1,3-bis-caprolactamyl-butene-(1): 126 grams (0.45 mol).

Recovered starting material: 32 grams (0.187 mol). Conversion: 90.5%.

Example 5

In an apparatus consisting of a four-necked flask of 1 liter capacity, a stirrer, a nitrogen inlet tube, a thermometer, cooling trap and cooler, 20 grams of acid (anionotropic) aluminum oxide according to Woelm and 0.5 gram of hydroquinone are added as stabilizers to 453.5 grams (3.17 mols) of N-(α-methoxyethyl)-pyrrolidone-(2). The separation of methanol starts already at 90° C. under a pressure of 45–50 mm. of mercury. After about 2 hours it is practically terminated, and 90 grams (2.81 mols=88.6% of theory) of methanol have distilled over. After filtering off the catalyst, the reaction mixture is subjected to fractional distillation. Under a pressure of 11 mm. of mercury and at 91–93° C. There are obtained 250 grams of N-vinyl-pyrrolidone-(2), which corresponds to a yield of 71% of theory.

Example 6

342 grams (2 mols) of N-(α-methoxy-β-methyl-n-propyl)-pyrrolidone-(2), 15 grams of acid (anionotropic) aluminum oxide according to Woelm and 0.5 gram of hydroquinone are slowly heated to 80–90° C. under a pressure of 40–50 mm. of mercury in the apparatus described in Example 5 while stirring vigorously and passing a stream of nitrogen through the apparatus. The separation of methanol starts at this temperature and is terminated by heating the reaction mixture for 3–4 hours at 100–110° C. The cooling trap contains 57 grams (89% of theory) of methanol. After removing the catalyst, the reaction mixture is subjected to distillation. By fractional distillation at 113–114° C. under a pressure of 10 mm. of mercury, there are obtained 208 grams of N-(β,β-dimethylvinyl)-pyrrolidone-(2), which corresponds to a yield of 75% of theory.

Example 7

398 grams (2 mols) of N-(α-methoxy-β-methyl-n-propyl)-caprolactam are split according to Example 5 by means of 15 grams of acid (anionotropic) aluminum oxide according to Woelm in the presence of 0.5 gram of hydroquinone. 240 grams (72% of theory) of N-(β,β-dimethylvinyl)-caprolactam boiling at 135–137° C. under a pressure of 12 mm. of mercury are obtained by fractional distillation.

Example 8

157 grams (1.2 mol) of N-(α-methoxyethyl)-N-methyl-acetamide are split according to Example 1 in the presence of 6 grams of acid (anionotropic) aluminum oxide according to Woelm at 90–110° C. within 1 hour. Thereby, 20.4 grams (0.64 mol) of methanol are isolated in the cooling trap, 73.4 grams of the starting compound are recovered and 49.5 grams (0.5 mol) of N-vinyl-N-methyl-acetamide boiling at 70–71° C. under a pressure of 25 mm. of mercury and having a refractive index of $n_D^{20}=1.4828$ are obtained.

Example 9

363 grams (2.5 mols) of N-(α-ethoxyethyl)-N-methyl-acetamide, 5.1 grams (2 mols percent) of acid (anionotropic) aluminum oxide according to Woelm, 6.1 grams (2 mols percent) of aluminum phosphate and 0.5 gram of hydroquinone are introduced into the apparatus described in Example 1. While stirring vigorously, the mixture is heated at a sump temperature of 110–130° C. under a pressure of 100 mm. of mercury. Thereby, the vinyl compound together with part of the alcohol is taken off continuously over the column. Another part of the separated ethanol is collected in the cooling traps. It is distilled to dryness, and the distillates are fractionated once again. There are obtained: 91.3 grams of ethanol, 75.4 grams of unchanged starting compound and 174.7 grams (1.76 mols) of N-vinyl-N-methyl-acetamide; boiling point 70° C. under a pressure of 25 mm. of mercury, refractive index $n_D^{20}=1.4828$. The splitting was carried through with a conversion of 79.2% and with a yield of N-vinyl-N-methyl-acetamide of 89% of theory.

We claim:

1. A process for preparing N-vinyl compounds of the formula

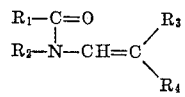

in which $R_1$ represents a lower alkyl group, $R_2$ represents a lower alkyl group and $R_1$ and $R_2$ together as a ring represent an alkylene group having 3 to 7 carbon atoms and $R_3$ and $R_4$ each represent a member of the group consisting of a hydrogen atom and a lower alkyl group, which comprises heating N-(α-alkoxyalkyl)-compounds of the formula

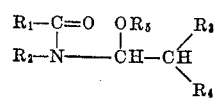

in which $R_1$, $R_2$, $R_3$, and $R_4$ have the meanings defined above and $R_5$ represents a lower alkyl group in liquid phase and in the presence of surface-active, insoluble substances having a weakly acid reaction, selected from the group consisting of acid aluminum oxide, aluminum phosphate, zirconium dioxide and mixtures thereof at a temperature between 50° and 180° C.

2. In a process for preparing an N-vinyl compound of the formula

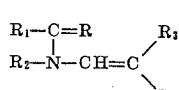

in which $R_1$ and $R_2$ individually are lower alkyl or together are an alkylene of 3 to 7 carbon atoms, and $R_3$ and $R_4$ are hydrogen or lower alkyl from a starting N-(α-alkoxyalkyl) compound of the formula

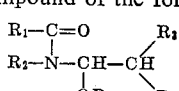

in which $R_1$, $R_2$, $R_3$ and $R_4$ are as defined above and $R_5$ is lower alkyl, the improvement which comprises heating the starting compound to a temperature of between about 50 and 180° C. in the presence of a surface-active, insoluble substance having a weakly acid reaction selected from the group consisting of acid aluminum oxide, aluminum phosphate, zirconium dioxide and a mixture thereof.

3. A process as defined in claim 2 wherein the weakly acid substance is acid aluminum oxide.

4. A process as defined in claim 2 wherein the weakly acid substance is aluminum phosphate.

5. A process as defined in claim 2 wherein the weakly acid substance is zirconium dioxide.

References Cited

UNITED STATES PATENTS 2,231,905 2/1941 Hanford et al. _____ 260—561
2,669,570 2/1954 Schnizer _____ 260—326.5

OTHER REFERENCES

Shostakovski et al., "Izvest. Akad. Nauk. SSR," "Otdel. Khim. Nauk," pp. 892–895 (1959).

Chemical Abstracts, vol. 41, cols. 6189–6192 (1947).
Chemical Abstracts, vol. 42, cols. 3649–3650 (1948).

JOHN D. RANDOLPH, Primary Examiner.

WALTER A. MODANCE, Examiner.

R. T. BOND, Assistant Examiner.